Aug. 19, 1958  R. M. FREY ET AL  2,848,430
TALL OIL-PHENOL-FURAN RESIN COMPOSITIONS
Filed Oct. 6, 1954  2 Sheets-Sheet 1

RAYMOND M. FREY
SHIRO F. SHIRAGA
INVENTORS.

BY Arnold J. Ericsen
ATTORNEY

Aug. 19, 1958

R. M. FREY ET AL 2,848,430

TALL OIL–PHENOL–FURAN RESIN COMPOSITIONS

Filed Oct. 6, 1954

RAYMOND M. FREY
SHIRO F. SHIRAGA
    INVENTORS.

BY Arnold J. Ericsen

ATTORNEY

United States Patent Office 2,848,430
Patented Aug. 19, 1958

2,848,430

TALL OIL-PHENOL-FURAN RESIN COMPOSITIONS

Raymond M. Frey, Milwaukee, and Shiro F. Shiraga, Cudahy, Wis., assignors to McGraw-Edison Company, a corporation of Delaware Application October 6, 1954, Serial No. 460,706

12 Claims. (Cl. 260—19)

This invention relates to insoluble, infusible, synthetic, polymeric and thermosetting resinous compositions, and especially relates to the phenol-furan resins and their production.

Furfural (furfuraldehyde), as currently used by phenolic resin manufacturers, contributes special and useful flow properties to the phenolic resins of commerce. These resins have generally been of the phenol-formaldehyde type. Furfural has primarily been used in reaction with synthetic phenol to prepare resins which, in turn, are ground and blended with the fast curing phenol-formaldehyde powdered resins in suitable ratios. Another method is to react mixtures of furfural and formaldehyde with phenol in the reaction kettle itself. Furfural plays an important role as a raw material for the phenolic resin blends, inasmuch as it has a high molecular weight compared with formaldehyde reflecting favorably in cost considerations; the raw material cost of a furfural-phenol resin is appreciably lower than that of a formaldehyde-phenol resin.

The present invention contemplates the reaction of phenol, or derivatives of phenol, with furfural and/or furfuryl alcohol with the addition of tall oil. Tall oil, a product recovered from the paper industry, is an organic product including a mixture of acids, esters and non-saponifiables varying in composition from time to time depending principally on the details of the method of preparation and refining of the crude tall oil. It is known, however, that both crude and refined tall oil include a major portion of unsaturated fatty acids such as oleic, linoleic and conjugated linoleic acid, in addition to various rosin acids and terpenes.

The precise mechanics of reaction in combining tall oil with phenol-furan resins are not clear at the present time, but it is known that there is a considerable amount of unsaturated components reacting to provide the resinous material. This is verified from the relatively high iodine numbers of tall oil, ranging from 140 to 210. It appears, that within a specified range, the entire amount of tall oil combines with the reaction product, inasmuch as there was no indication of the presence of side components after polymerization had taken place, when certain proportions less than an excess were reacted with one another. Undoubtedly, ingredients of tall oil that do not react directly, act as helpful extenders, which do not materially affect the chemical resistance or mechanical strength of the phenol-furan resin.

It will be noted from the examples given hereinbelow that no formaldehyde is used, nor is it required to provide a thermosetting resinous product having desired mechanical and chemical resistance. It will become apparent that the complete substitution of tall oil for formaldehyde considerably reduces the cost of the resin.

After it had been determined that a successful resinous thermosetting product may be obtained from the reaction of phenol, tall oil and furfural, a study was conducted of combinations of various proportions of phenol, tall oil and furfuryl alcohol. Although certain proportions of these components did provide thermosetting resins of homogeneous texture, the percentages of furfuryl alcohol were, in general, considerably less than those of the furfural used in the previous-described system.

In addition to the above-mentioned systems, both furfural and furfuryl alcohol were used in a system including phenol and tall oil to produce favorable results. In attempting to combine phenol, tall oil, furfural and furfuryl alcohol, it appears that furfuryl alcohol has a deleterious effect as compared to the phenol, tall oil and furfuryl alcohol formulations. Apparently, the slower reaction time of furfural in the four component system acts as a modifier for the furfuryl alcohol and allows more time in which to form thermosetting plastics. However, although thermosetting resins are produced, a great share of them are not particularly good from the standpoint of mechanical strength, and many were heterogeneous.

Various substituted phenols were also investigated for use in systems comprising tall oil and furfural or tall oil and furfuryl alcohol. Certain of these substituted compounds provided acceptable resinous materials and include: p-chlorophenol, o-chlorophenol, o-cresol, m-cresol, p-cresol, cresol, carvacrol, p-methoxyphenol, eugenol, p-phenylphenol, p-(benzyloxy)phenol, catechol, 2-naphthol, resorcinol, cyclohexanol, and 5-hydroxy-1,3-dimethylbenzene.

It will be observed from the variety of substituted phenols that were tried, the addition of tall oil to the basic phenol-furan system, in no way, materially affected the chemical reaction. The phenolic materials used provided extensive variations from phenol itself, comprising hydroxyphenyl ethers, halogenated phenols, alkyl phenols, dihydroxy benzenes, naphthol, phenylphenol and cyclohexanol.

It is of interest to note that crude tall oil compositions obtained for investigation have had the following range of compositions and the characteristics:

| | |
|---|---|
| Fatty acids_____percent__ | 40–60 |
| Rosin acids_____do____ | 35–50 |
| Saponification number_____ | 155–185 |
| Acid number_____ | 155–175 |
| Iodine number_____ | 140–210 |
| Unsaponifiable matter _____percent__ | 5–10 |
| Rosin acid number_____ | 60–95 |
| Moisture content_____percent__ | .4–1.5 |

The invention will now be described with reference to the accompanying drawings in which.

Typical examples of carrying out the present invention using crude tall oil as a modifier or extender for phenolic-furan resins are given below:

Example 1

Figure 1:
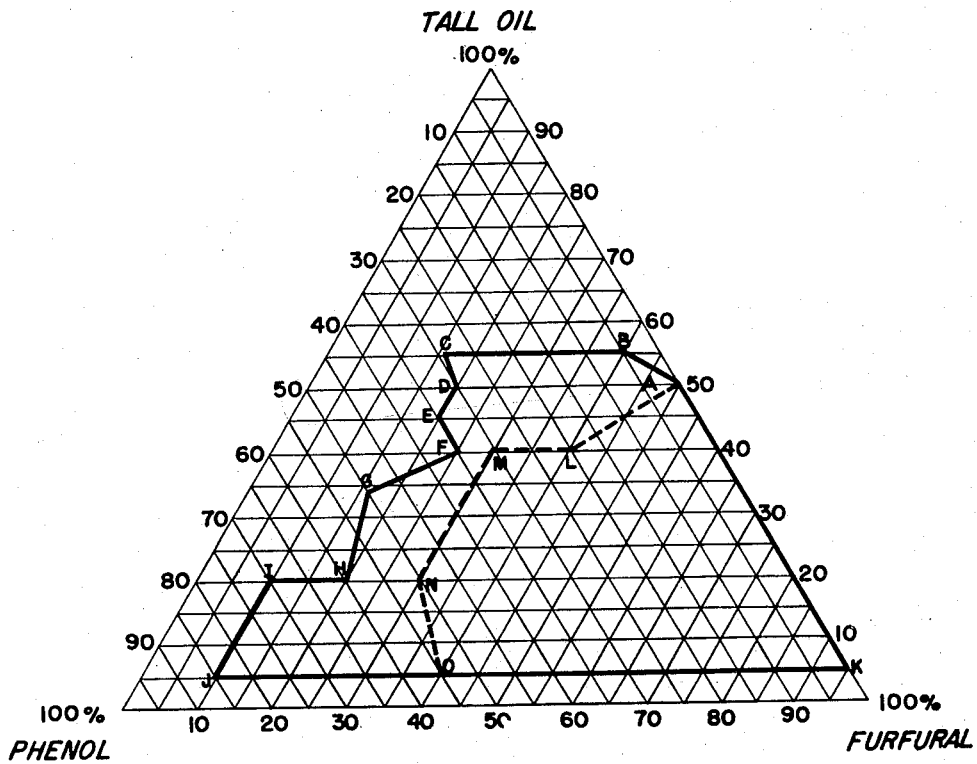
Fig. 1 shows a ternary diagram defining regions in which thermosetting resinous compositions have been produced on reacting phenol, tall oil and furfural (furfuryl aldehyde).

The system comprising the components of phenol, tall oil and furfural, as shown in Fig. 1, was investigated primarily with the use of p-toluene sulfonyl chloride as a catalyst. The reaction was found to be electrophilic in nature, and accordingly, is responsive to many of the well-known Lewis acid catalysts. It is desirable to use a latent catalyst, which is relatively non-reactive at room temperature or relatively low temperatures at which the materials may be worked. This use will provide a better control factor to avoid dangerous spontaneous reactions with certain of the ingredients. It is known that certain of the Lewis acid catalysts react at various threshold temperature levels making them ideally suited to condensation reactions, which are often dependent upon the amount of heat applied wherein reaction control becomes a considerable importance. In addition to the above-mentioned catalyst, diethyl sulfate and benzene sulfonic acid have provided acceptable results when used in the amount of from 1 to 4%, by weight, of the total mix.

All of the constituents were mixed at room temperature in the presence of the catalyst and a hot water bath was used to heat the mixture to an exothermic reaction temperature. Upon reacting, the mixture was removed from the bath until reaction subsided, then replaced in hot water and the temperature of the mix was maintained at about 198° F.±10° F. The samples were cured in an 85° C. oven or a 110° C. oven, when necessary, to produce a thermosetting resin. A hard, shiny, strong thermosetting material of excellent texture was also obtained by the addition of a 2:1:1 ratio, respectively, of crude tall oil, furfural and phenol with 1-3% by weight of diethyl sulfate. The actual amounts used were 20 grams of crude tall oil, 10 grams of furfural and 10 grams of phenol. This would resolve itself into 50% tall oil, 25% furfural and 25% phenol as reflected in the ternary diagram of Fig. 1.

A considerable number of mixes of various proportions were evaluated under the method described above to complete the areas outlined in the diagram of Fig. 1.

In the diagram of Fig. 1, the respective sides of the triangle indicate the percentages by weight of phenol, tall oil, and furfural, from 0 to 100%. The compositions that have been found to be operative as thermosetting materials are approximately defined on this diagram by the solid lines.

Thermosetting resins are obtained from composition ranges lying in the area defined by the solid lines AB, BC, CD, DE, EF, FG, GH, HI, IJ, JK, and KA. The preferred formulations, which provide the desired homogeneous hard, infusible, resin having excellent physical properties were obtained from reactions of phenol, tall oil and furfural lying in the area defined by the dotted lines AL, LM, MN, NO, OK and KA.

Example 2

Figure 2:
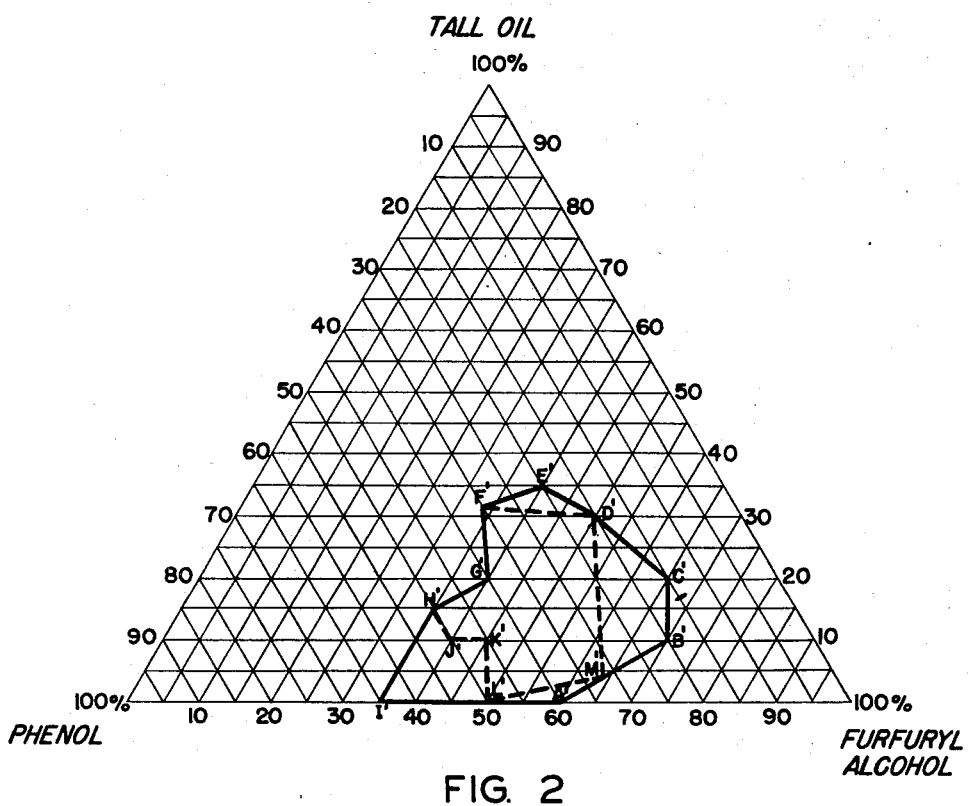
Fig. 2 shows a ternary diagram similar to Fig. 1 defining regions in which thermosetting resinous compositions have been produced on reacting phenol, tall oil and furfuryl alcohol.

The scope of the thermosetting field was greatly reduced by substituting furfuryl alcohol for furfural in combination with phenol and crude tall oil. This will be apparent from an examination of the ternary diagram of Fig. 2. Experimentation indicated that thermosetting resins may be produced with not less than 15%, nor more than 65% phenol, in combination with a maximum of 35% tall oil and limits of approximately 35% to approximately 70% of furfuryl alcohol. The same procedure for preparing the resin was used as outlined in the previous example. That is, the catalyst was p-toluene sulfonyl chloride in the amount of 2%, by weight, of the total weight of the mix. All constituents were mixed at room temperature in the presence of the catalyst. A hot water bath was used to heat the mixture to the reaction temperature. Upon reacting, the mixture was removed from the bath until reaction subsided, then replaced in hot water and a temperature of mix maintained around 198° F.±10° until the desired viscosity for casting was obtained. Samples were cured in an 85° C. oven or a 110° C. oven, if necessary, to produce a thermosetting resin.

As stated above, thermosetting resins were produced by proportions of tall oil, phenol, and furfuryl alcohol lying in the range defined by the solid lines of the ternary diagram A'B', B'C', C'D', D'E', E'F', F'G', G'H', H'I' and I'A'. The preferred formulations providing resins having all of the desired characteristics, in addition to being thermosetting, consisted of proportions of tall oil, phenol and furfuryl alcohol lying in the range defined by the dotted lines D'F', F'G', G'H', H'J', J'K', K'L', L'M', and M'D'.

Example 3

An investigation of a four component system comprising the mixture of phenol, furfural, furfuryl alcohol and tall oil was next made. This investigation brought forth that thermosetting resins could be produced only when a minimum of 30% of the furan compounds was present. Of the furan portion, at least 50% furfural is needed. When the proportions of the furfural-furfuryl alcohol are in excess of 60% of the total mix, the furfural must be at least 10% of the total. The proportions of the remaining constituents, phenol and crude tall oil, do not appear to have any appreciable effect on the reaction and have a negative effect on the physical properties of the cured plastic.

A representative selection of proportions of the four component members was made in accordance with the above-outlined procedure utilizing the catalyst of p-toluene sulfonyl chloride in the amount of 2%, by weight, of the total weight of the mix. The chart listed below gives the typical selected proportions, in terms of percentage, along with comments as to the thermosetting resin obtained:

| Percent Phenol | Percent Tall Oil | Percent Furfural | Percent Furfuryl Alcohol | Comments |
|---|---|---|---|---|
| 5 | 25 | 5 | 65 | No good. |
| 5 | 25 | 10 | 60 | Fair. |
| 5 | 25 | 65 | 5 | Good. |
| 5 | 25 | 60 | 10 | Fair. |
| 10 | 10 | 40 | 40 | Good. |
| 10 | 20 | 50 | 20 | Fair. |
| 10 | 50 | 20 | 20 | Good. |
| 20 | 20 | 10 | 50 | Fair. |
| 20 | 60 | 5 | 15 | No good. |
| 35 | 40 | 10 | 15 | Do. |
| 35 | 35 | 15 | 15 | Fair. |
| 35 | 35 | 20 | 10 | Do. |
| 35 | 35 | 10 | 20 | No good. |
| 40 | 30 | 5 | 25 | Do. |
| 50 | 20 | 10 | 20 | Do. |
| 60 | 5 | 5 | 30 | Good. |
| 60 | 5 | 30 | 5 | Do. |
| 65 | 5 | 5 | 25 | No good. |

After it had been determined that phenol, tall oil, furfural and furfuryl alcohol would react together to provide a thermosetting resin, various substituted phenols were next investigated for reaction with tall oil and furfuryl alcohol or furfural. Examples of these compounds are given below:

Example 4

*Hydroxy phenyl ethers.*—Various examples of these substituted phenols were combined with tall oil and furfural and tall oil plus furfuryl alcohol. The catalyst used again was p-toluene sulfonyl chloride in the amount of 2% by weight of total mix.

A. 10 grams of crude tall oil, 10 grams of furfural were mixed in the presence of the catalyst with 10 grams of p-methoxyphenol:

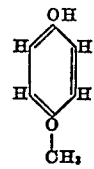

This mixture was reacted as outlined above in connection with the previously described examples and polymerized to a thermosetting resin. The above ratio of components was again reacted except for the substitution of furfuryl alcohol for the furfural and also produced a thermosetting resin.

B. 10 grams of tall oil, 10 grams of furfural were mixed in the presence of the catalyst with 10 grams of eugenol:

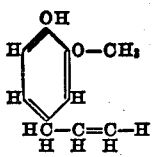

These components were reacted under the above-stated method and produced a thermosetting resin. A 1:1:1 ratio, by weight, of the components were mixed with furfuryl alcohol, being substituted for furfural, and again these ingredients produced a thermosetting resin under the above-described method.

C. p-(benzyloxy) phenol was mixed with furfural and tall oil in a 1:1:1 ratio in the presence of the above catalyst under the method described and produced a thermosetting resin. The structural formula of p-(benzyloxy) phenol is:

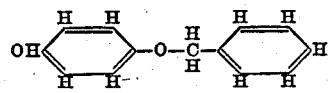

When furfuryl alcohol was substituted for furfural in the mixture of the furan, tall oil, and p-(benzyloxy) phenol under the above method and with the same catalyst, a thermosetting resin was again obtained.

*Example 5*

Chloro phenols.—Both para and ortho chloro phenol were reacted with the furans and tall oil to produce thermosetting resins. Both compounds were reacted in a 1:1:1 ratio, by weight, with furfural, and tall oil, or the same ratio of tall oil and furfuryl alcohol in the presence of the catalyst p-toluene sulfonyl chloride. Both the para and ortho chloro phenols provided excellent thermosetting resins with both furan compounds as individually combined with tall oil.

*Example 6*

Alkyl phenols.—A number of alkyl phenols of the general structural formula

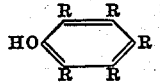

where R is an alkyl or hydrogen were investigated and include:

A. o-cresol which was mixed in a 1:1:1 ratio, by weight, with furfural and tall oil, in the presence of p-toluene sulfonyl chloride in the amount of 2%, by weight, all constituents being mixed at room temperature. The ingredients were placed in a hot water bath and heated until they reacted exothermically. Upon reacting, the mixture was removed from the bath until the reaction subsided, and then replaced in hot water and a temperature of mix was maintained at around 198° F.±10°. The samples were cured in an 85° C. oven or a 110° C. oven, when necessary, to produce a thermosetting resin.

B. m-cresol reacted in a 1:1:1 ratio, by weight, with furfural and tall oil to produce a thermosetting resin. m-Cresol also reacted in a 1:1:1 ratio, by weight, with furfuryl alcohol and tall oil to produce a thermosetting resin.

C. p-Cresol, when reacted in a 1:1:1 ratio, by weight, with tall oil and furfural, produced a thermosetting resin; whereas, when this substituted phenol was reacted with tall oil and furfuryl alcohol under the above outlined procedure, the product was not thermosetting.

D. A mixture of the ortho, meta and para cresols produce a thermosetting resin when combined in a 1:1:1 ratio, by weight, of furfural and tall oil, but not when combined with tall oil and furfuryl alcohol.

E. A 1:1:1 ratio, by weight of furfural, tall oil and carvacrol

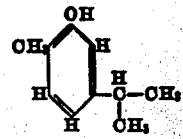

were reacted to provide a thermosetting resin. The carvacrol also reacted in a 1:1:1 ratio, by weight, with furfuryl alcohol and tall oil to produce a thermosetting resin.

F. In addition to the above alkyl phenols, the 5-hydroxy-1,3-dimethyl benzene

was reacted to provide a thermosetting resin in a 1:1:1 ratio, by weight, with furfural and tall oil under the above outlined conditions and with the above catalyst. The 5-hydroxy-1,3-dimethyl benzene, however, did not produce a thermosetting resin when combined in a 1:1:1 ratio with furfuryl alcohol and tall oil.

Although the furfuryl alcohol did not react in every instance with the alkyl phenols to produce thermosetting resins, it is to be stated that only 1:1:1 ratio was used to perform the experiments. Perhaps the substituted phenol will react under other specified conditions as indicated by the reaction with carvacrol which has the additional longer chain alkyl group attached to the benzene ring.

*Example 7*

Dihydroxy benzenes.—Both catechol and resorcinol were investigated, and it is interesting to note that only the catechol

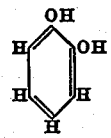

produced the thermosetting resin when combined in a 1:1:1 ratio, by weight, with furfural and tall oil. The resorcinol

did not react in the 1:1:1 ratio to produce the thermosetting resin with either the furfural or the furfuryl alcohol. Catechol, on the other hand, did produce the resin with furfural, but not with the furfuryl alcohol. The above-mentioned conditions were adhered to for the investigation of the dihydroxy benzenes.

*Example 8*

An investigation was next conducted with the furan compounds, tall oil and 2-naphthol:

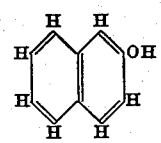

Here, again, the compound reacted favorably with furfural and tall oil, in a 1:1:1 ratio, by weight, to produce a thermosetting resin. However, when 2-naphthol was reacted under the same conditions as heretofore mentioned, with tall oil and furfuryl alcohol, a thermosetting resin was not produced.

*Example 9*

Contra, when an aryl phenol, such as p-phenylphenol,

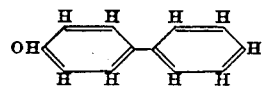

was reacted in a 1:1:1 ratio with furfural and tall oil, a thermosetting resin was produced. In addition, this substituted phenol was reacted with furfuryl alcohol and tall oil in a 1:1:1 ratio to produce a thermosetting resin.

*Example 10*

An excellent thermosetting resin was produced by combining furfural, tall oil and cyclohexanol

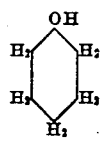

in a 1:1:1 ratio under the above outlined conditions; whereas, when this substituted phenol was reacted in a 1:1:1 ratio with furfuryl alcohol and tall oil, no reaction took place.

It will be apparent from the above description, taken in connection with the accompanying drawings, that an improved thermosetting resin of the phenol-furan type has been provided, which resin incorporates a relatively large amount of tall oil to provide a composition of matter inexpensive to produce, compatible with conventional filler materials, and which resin does not depart from the desirable physical and chemical characteristics of conventional phenol-furan resins.

We claim:

1. A composition of matter comprising a polymerized material obtained by effecting reaction between ingredients including a furan compound selected from the group consisting of furfural and furfuryl alcohol; tall oil and a hydroxyl compound selected from the group consisting of o- and p-chlorophenol, o-, m-, and p-cresol, carvacrol, p-methoxyphenol, eugenol, p-phenyl phenol, p-(benzyloxy) phenol, catechol, 2-naphthol, 5-hydroxy 1,3 dimethylbenzene, cyclohexanol, and mixtures thereof; the amount of furan compound being at least 10% by weight of the total mix.

2. The composition of claim 1, wherein the aromatic hydroxyl compound is phenol.

3. A composition of matter comprising a polymerized material obtained by effecting reaction between ingredients including a mixture of phenol, tall oil and furfural, which are present in relative percentages by weight lying within the area defined approximately by the solid lines AB, BC, CD, DE, EF, FG, GH, HI, IJ, JK, and KA in the ternary diagram comprising Fig. 1 of the accompanying drawings the phenol content however always being at least 5%.

4. A composition of matter comprising a polymerized material obtained by effecting reaction between ingredients including a mixture of phenol, tall oil and furfural, which are present in relative percentages by weight lying within the area defined approximately by the dotted lines AL, LM, MN, NO, OK and KA in the ternary diagram comprising Fig. 1 of the accompanying drawings the phenol content however always being at least 5%.

5. A composition of matter comprising a polymerized material obtained by effecting reaction between ingredients including a mixture of phenol, tall oil and furfuryl alcohol, which are present in relative percentages by weight lying within the area defined approximately by the solid lines A'B', B'C', C'D', D'E', E'F', F'G', G'H', H'I', and I'A' in the ternary diagram comprising Fig. 2 of the accompanying drawings.

6. A composition of matter comprising a polymerized material obtained by effecting reaction between ingredients including a mixture of phenol, tall oil and furfuryl alcohol, which are present in relative percentages by weight lying within the area defined approximately by the dotted lines D'F', F'G', G'H', H'J', J'K', K'L', L'M' and M'D' in the ternary diagram comprising Fig. 2 of the accompanying drawings.

7. The composition of claim 1, wherein the hydroxyphenyl ether compound is eugenol.

8. The composition of claim 1, wherein the chlorophenol compound is o-chlorophenol.

9. The composition of claim 1, wherein the alkyl phenol compound is o-cresol.

10. The composition of claim 1, wherein the alkyl phenol compound is m-cresol.

11. The composition of claim 1, wherein the alkyl phenol compound is carvacrol.

12. The composition of claim 1, wherein the alkyl phenol compound is 5-hydroxy-1,3-dimethylbenzene.

References Cited in the file of this patent

UNITED STATES PATENTS

| 2,072,143 | Ubben _____ Mar. 2, 1937 |
| 2,309,610 | Burrell _____ Jan. 26, 1943 |

FOREIGN PATENTS

| 889,586 | France _____ Jan. 13, 1944 |
| 892,893 | France _____ May 23, 1944 |